(12) United States Patent
Caldwell et al.

(10) Patent No.: US 6,791,093 B2
(45) Date of Patent: Sep. 14, 2004

(54) ANALYSIS OF MATERIALS CONTAINING RADIOACTIVE SOURCES

(75) Inventors: John Thomas Caldwell, Los Alamos, NM (US); Stephanie Ann Jones, Los Alamos, NM (US); Matthew Robert Newell, Los Alamos, NM (US)

(73) Assignee: British Nuclear Fuels PLC, Warrington (GB)

( * ) Notice: Subject to any disclaimer, the term of this patent is extended or adjusted under 35 U.S.C. 154(b) by 0 days.

(21) Appl. No.: 10/454,429

(22) Filed: Jun. 4, 2003

(65) Prior Publication Data

US 2003/0205677 A1 Nov. 6, 2003

Related U.S. Application Data

(63) Continuation of application No. 10/086,759, filed on Feb. 28, 2002, now abandoned, which is a continuation of application No. 09/441,874, filed on Nov. 17, 1999, now abandoned.
(60) Provisional application No. 60/108,795, filed on Nov. 17, 1998.

(51) Int. Cl.[7] .............................. G01J 1/42; G01J 1/00
(52) U.S. Cl. ...................................... 250/395; 250/362
(58) Field of Search .............................. 250/395, 362, 250/370.06, 393

(56) References Cited

U.S. PATENT DOCUMENTS 4,617,169 A * 10/1986 Brodzinski et al. ......... 376/257

OTHER PUBLICATIONS

J. Morel et al, "A Non–Destructive Method Based on Gamma Spect for the Measurements□□of Pu Hold–Up or Pu Wastes", Conf. Title: 3. Internat. Conf. on Facility Operations Safeguards Interface, San Diego, Ca 11/87, Trans. American Nucl Society, vol. 55.*

Matthew R. Newell et al, "Performance of WIP Certifiable Mobile Waste Characterization NDA□□Measurements of TRU Waste Drums at LLNL.", Nuclear Material Management, 1998, Vo. 27, No. 3, pp. 1801–1807.*

IPAN/GEA Drum System, Imaging Passive–Active Neutron/Gamma Energy Assay Drum□□System, Brochure for BNFL Instruments, Ltd., England, 1997.*

IPAN/GEA Crate System, Imaging Passive–Active Neutron/Gamma Energy Assay Crate□□System, Brochure for BNFL Instruments, Ltd., England, 1997.*

J. Morel et al, *A Non–Destructive Method Based on Gamma pectrometry for the Measurements of Plutonium Hold–up or Plutonium Wastes*, Conference Title: 3. International Conference on Facility Operations Safeguards Interface, San Diego, California, Nov. 1987, Transactions of the American Nuclear society, vol. 55.

Matthew R. Newell et al, *Performance of WIPP Certifiable Mobile Waste Characterization NDA Measurements of TRU Waste Drums at LLNL.*, Nuclear Material Management, 1998, Vo. 27, No. 3, pp. 1801–1807.

IPAN/GEA Drum System, Imaging Passive–Active Neutron/Gamma Energy Assay Drum System, Brochure for BNFL Instruments, Ltd., England, 1997.

IPAN/GEA Crate System, Imaging Passive–Active Neutron/Gamma Energy Assay Crate System, Brochure for BNFL Instruments, Ltd., England, 1997.

* cited by examiner

*Primary Examiner*—Scott J. Sugarman
*Assistant Examiner*—Richard Hanig
(74) *Attorney, Agent, or Firm*—Workman Nydegger

(57) ABSTRACT

The invention provides a technique for correcting gamma ray intensities detected to account for variation in attenuation effects with energy. The corrected intensity values enable more accurate isotopic analysis to be conducted and render such techniques applicable to low level emission cases. The technique is particularly useful in investigate waste materials with a gamma emitting content which needs to be determined. The attenuation is corrected for using a bi-modal function to account for the attenuation effects arising from low and high atomic mass components of the material in which the emitters are present.

27 Claims, 9 Drawing Sheets

ANALYSIS OF MATERIALS CONTAINING RADIOACTIVE SOURCES

CROSS-REFERENCE TO RELATED APPLICATIONS

This application is a continuation of U.S. patent application Ser. No. 10/086,759, filed Feb. 28, 2002 now abandoned, which is a continuation of patent application Ser. No. 09/441,874, filed Nov. 17, 1999 now abandoned, which claims priority to Provisional Application Serial No. 60/108,795, filed Nov. 17, 1998, which for purposes of disclosure are incorporated herein by specific reference.

BACKGROUND OF THE INVENTION

1. The Field of the Invention

This invention concerns improvements in and relating to analysis of materials containing radioactive sources, particularly, but not exclusively to analysis of waste materials containing plutonium and/or other radioactive materials.

2. The Relevant Technology

When analyzing materials which potentially contain radioactive sources, it is strongly desirable to be able to accurately analyze the level of radioactive sources in the material. This is a complicated consideration as variations in the amounts and types of radioactive sources and in the amounts and types of material in which they are present, all affect the analysis. The geometric distribution of the emitters within the material constituents is also a complicating factor.

BRIEF SUMMARY OF THE INVENTION

The present invention aims to provide an analysis which is more accurate and complete than previously performed analysis.

According to a first aspect of the invention we provide a method for processing information relating to gamma emissions, the method comprising the steps of obtaining an intensity signal at a plurality of gamma ray energies, the intensity at the plurality of energies being corrected for variation in attenuation with energy.

The method may form part of an investigation into the level of one or more gamma emitting materials in a sample.

The plurality of gamma ray energies may including a plurality of gamma ray energies characteristic of an isotope. The method may form part of a calculation of the level of the isotope and/or one or more other isotopes, with the calculation employing the corrected intensities.

According to a second aspect of the invention we provide a method for investigating the level of one or more gamma emitting materials in a sample, the method comprising the steps of obtaining an intensity signal at a plurality of gamma ray energies, the plurality of energies including a plurality of energies characteristic of an isotope, the intensity at the plurality of energies for the isotope being corrected for variation in attenuation with energy, the method calculating levels for the isotope and/or one or more other isotopes from the corrected intensities for the plurality of energies for the isotope.

Preferably the attenuation correction involves the calculation of a value, ideally an absolute value, for an isotope derived from the intensity at one or more characteristic energies, corrected according to a factor, the calculated value being used together with a calculated value derived from the intensity at one or more characteristic energies, including one or more different energies from the first set. Preferably a value is derived from the intensity at one energy in each case.

Preferably three or more, and ideally five or more, calculated values are employed. For $Pu^{239}$ the gamma energies are preferably 98.4, 129, 203, 375 and 414 keV.

Preferably the calculated values for a set of energies obtained using the factor are considered against the calculated values for a set of energies obtained using the factor, the factor being varied between sets. Preferably the calculated values in a set are considered in a weighted manner. Most preferably those energies having a greater intensity are given a greater weighting than those having a lower intensity. The weighting may be predetermined according to the significance of the various energies used. Preferably the same energies are used in each set.

Preferably the consideration of the calculated values, most preferably in sets, involves a statistical evaluation. The statistical evaluation may involve a consideration of the difference between the calculated values or between sets thereof. The standard deviation of the calculated value for one set may be considered against the standard deviation of the calculated value for another set. Other measures of deviation may be considered. Preferably a least squares analysis is performed.

Preferably the consideration is repeated with sets corrected using different factor values. Preferably the factor values are adjusted to minimize the difference in calculated values and/or their standard deviation.

Preferably the calculated value is the mass of an isotope.

Preferably the factor includes two or more variable components. Preferably the attenuation correction is provided according to a bimodal correction factor.

Preferably one component in the correction factor relates to the attenuation effect of lower atomic mass elements (for instance less than 30, or more preferably less than 20) and/or the other component relates to the attenuation effect of high atomic mass components (for instance greater than 30, more preferably greater than 50) in the sample.

Preferably the factor is defined by:

$$G(E_{gam}) = e^{(-K1 \cdot f1)} * e^{(-K2 \cdot f2)}$$

where K1 and K2 are attenuation correction fit parameters and f1 and f2 are the "low Z" and "high Z" functions of gamma energy.

Preferably attenuation correction is provided together with detector efficiency correction and/or together with gamma line emission rate correction. Preferably all three corrections are provided. The correction factors may be applied together. Where applied separately preferably the detector efficiency and/or emission rate correction are applied before the attenuation correction.

Gamma line emission rate correction may be provided to take into account the different emission rates at different energies. The intensity at a given energy may be divided by the emission rate for that energy to give correction. The emission rate information may be obtained from a database. Detector efficiency correction may be provided to take into account non-attenuation effects which vary with energy.

Detector efficiency correction may be provided to take into account the variation in efficiency of detection of gammas at different energies within the spectrum. The intensity at a given energy may be divided by the detector efficiency for that energy to give the correction. The detector efficiency with energy profile may be obtained from manufacturers information for the detector or by investigation with known energy emission samples.

The overall correction may be provided according to the equation:

$$M_{yx@y} = \frac{R_{y@y}}{\varepsilon_{y@y} A_{yx@y} e^{-f1K1} e^{-f2K2}} g - x$$

to give the mass of isotope x in grams (g-x); where $R_{y@y}$ is the count rate of the gamma peak for isotope x at energy y; $\varepsilon_{y@y}$ is the efficiency of the detector system at energy y; $A_{y@y}$ is the specific activity of isotope x at energy y; and $e^{-f1K1} e^{-f2K2}$ is a two-material attenuation model.

The attenuation correction may include correction for the contribution to an intensity value by isotopes other than the isotope under evaluation. Correction in this way may avoid too high a level being determined for that isotope. The gamma line overlap correction may be provided by deducting from the computed mass for an isotope a correction mass. The correction mass may be determined according to the equation:

$$M_{yz@y} = \frac{\overline{M_{yz}} A_{yz@y}}{A_{yz@y}} g - x$$

to give the mass of isotope x in grams (g-x) where $\overline{M_{yz}}$ is the average mass of interfering isotope z computed using its dominant lines, interfering at energy y with isotope x. The corrected mass may then be used in the above mentioned statistical process for the attenuation factor correction. Preferably the extent of interference is recalculated in each iteration of the process. In this way feedback relating to the level of interference as the components vary can be provided.

Preferably an attenuation co-efficient for the desired energy spectrum is determined from the attenuation correction factor. Preferably the attenuation co-efficient is used to correct all the gamma intensity values used in the subsequent calculations.

The subsequent calculations may be isotopic level or mass calculations for the materials present in the sample. Absolute values may be obtained as the affects of the matrix containing the emitters have been accounted for fully. Direct comparison with calibration samples, having no attenuation effects, are therefore possible.

Preferably the isotopic calculation includes calculation of gamma emitting and/or non-gamma emitting isotopes. The level of non-gamma emitting isotopes may be determined through isotopic correlation. The level of non-gamma emitters may be derived based on a ratio relative to determined levels for one or more gamma emitters. Preferably the level is determined from a plurality of ratios to measured emitters, the level obtained from each emitter being combined, statistically, to give an overall level result.

The results obtained from the gamma emission investigations may be compared with, directly or indirectly, comparable information from other investigations. The other investigations may include passive neutron and/or active neutron monitoring techniques. The compared results may include: ratio to $Pu^{239}$ gamma mass; and/or ratio to total Pu gamma mass; and/or comparison of the $Pu^{239}$ gamma mass from the gamma system to the active mass from the neutron systems; and/or accounting for level of uranium, particularly $U^{233}$ and $U^{235}$, including ratio relative to $Pu^{239}$ gamma mass, ratio of $U^{233}$ to $Pu^{239}$ mass, ratio of $U^{235}$ to $Pu^{239}$ mass, overall active mass level; and/or determination of $Pu^{240}$ eff; and/or determining the presence of $Cf^{252}$ and/or $Cm^{244}$ and/or their levels.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2b illustrates an equivalent plot for a 5 g aliquot of the 2 kg sample shown in FIG. 2a;

DETAILED DESCRIPTION OF THE PREFERRED EMBODIMENTS

A variety of situations call for the analysis of materials to determine the nature of the radioactive emitters in the material. Such situations frequently occur in waste disposal situations where the nature, level and distribution of sources within a body of waste material needs to be determined. These factors are important in grading the waste, for instance, for the appropriate subsequent disposal route. Difficulties in obtaining a fully accurate account of the radioactivity can occur due to the wide variation in conditions encountered.

Instrument Overview

Figure 1:
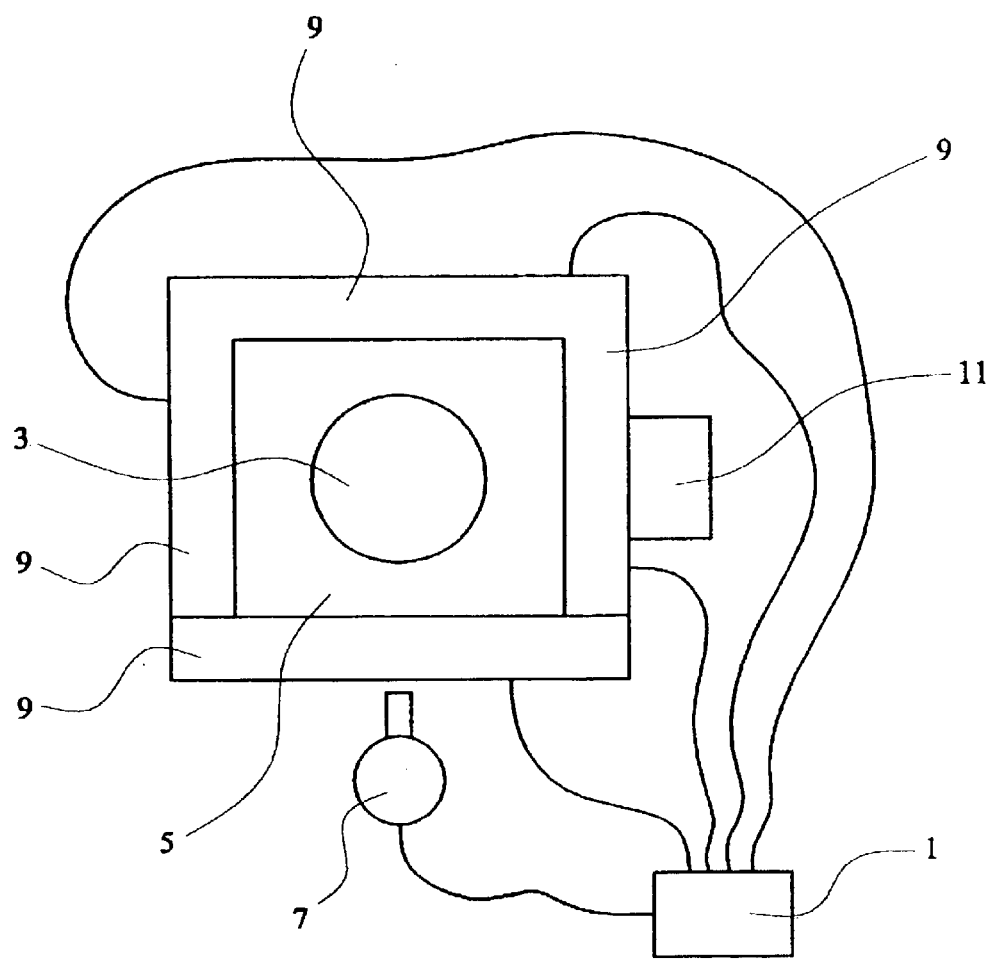
FIG. 1 illustrates an instrument suitable for implementing the present invention.

The instrument illustrated in FIG. 1 is intended to provide analysis of radioactive source incorporating materials, particularly waste material, so as to allow appropriate further action to be taken on that material. In the case of waste, this may include the appropriate waste disposal function.

The instrument provides information relating to the level of radioactive material in the sample, information about its isotopic composition and information about the spatial distribution of the radioactive emitters in the material. The instrument is specifically intended to analyze plutonium and/or uranium containing wastes, but information on other elements and/or isotopes can also be obtained.

The instrument consists of a data processing unit (1) for analyzing the outputs from the detectors and presenting results in a useful manner to the operator. The material to be analyzed is presented in container (3) to detecting location (5). The detecting location (5) may optionally include scales for weighing the material container (3) and/or for rotating the container (3) to obtain analysis from different directions.

The material is analyzed by performing three separate measurements on it. The first measurement comprises a passive HPGe high resolution gamma energy analysis using detector (7) collimated to detect gamma emissions arising from within the container (3).

The second analysis is an active neutron measurement employing a series of He-3 neutron detectors (9) distributed around the container to be analyzed together with a pulsed D-T neutron source (11). The detectors in effect monitor the material effect, particularly attenuation, on the emitted neutrons as they pass through the material.

The third analysis is a passive neutron measurement which employs the same He-3 neutron detectors (9) to monitor neutrons arising from the radioactive sources within the container (3). The three sets of information are used in subsequent evaluations.

Gamma Emission Intensity Evaluation

The planar HPGe detector (7) is utilized to obtain a comprehensive gamma spectrum determination of the contents of the material in the container (3).

The measurement of the actual gamma emissions at varying energies, however, is not a straightforward matter. The actual detected emission intensities are a function of a significant number of variables within the container being monitored. The amount of gamma emitting material present, the type of gamma emitting material present and the geometric disposition of those emitters within the container all influence the actual gamma emissions measured. The attenuating effects of the material within which the gamma emitters are distributed also significantly affects the detected response.

In making any determination, particularly for safeguards, criticality, transport and disposal purposes, it is the actual levels of original emission which need to determined, not the detected levels.

Figure 2A:
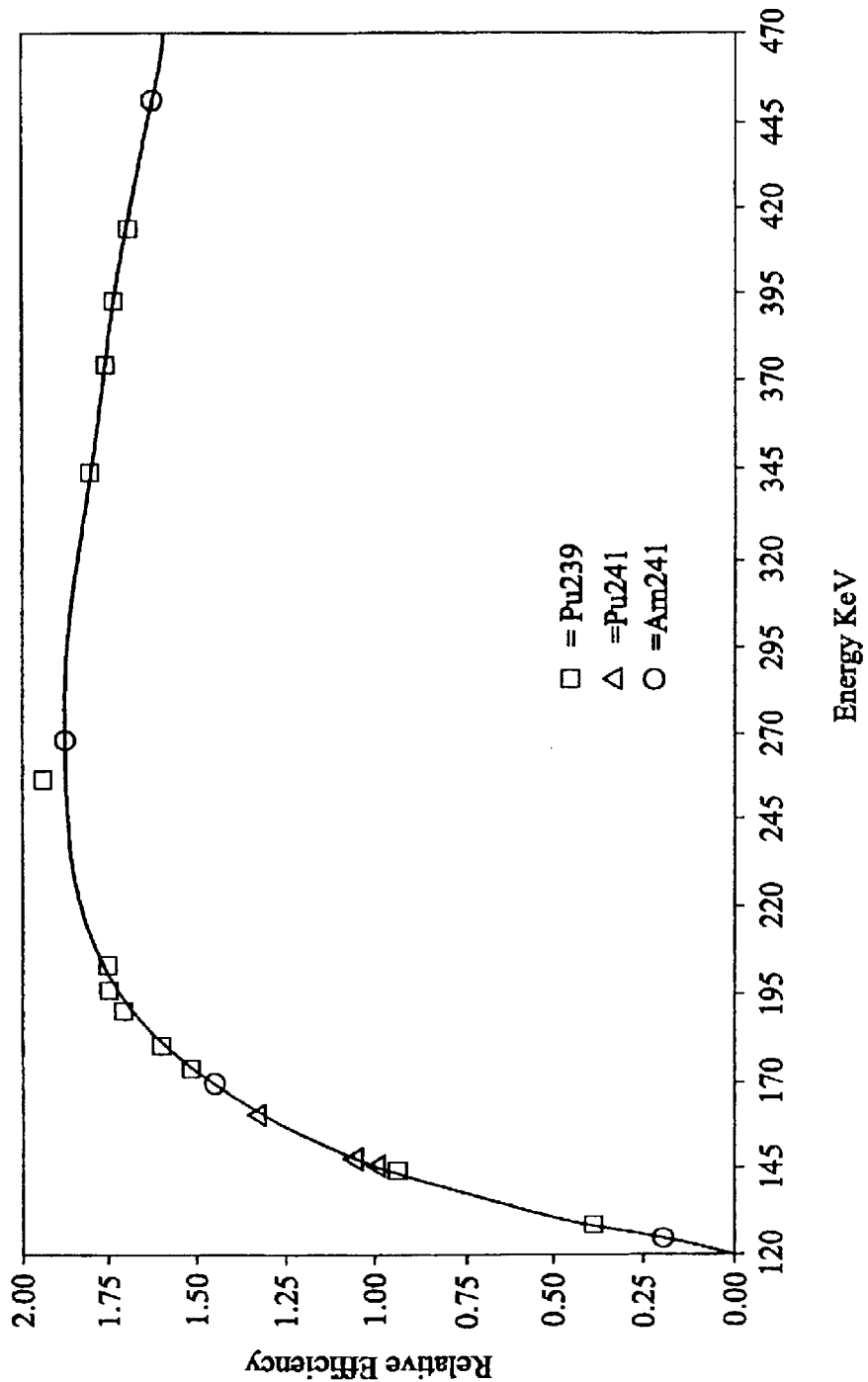
FIG. 2a illustrates a natural logarithm plot in relative units relating to detector efficiency against gamma ray energy for a 2 kg aged plutonium oxide sample.
Figure 2B:
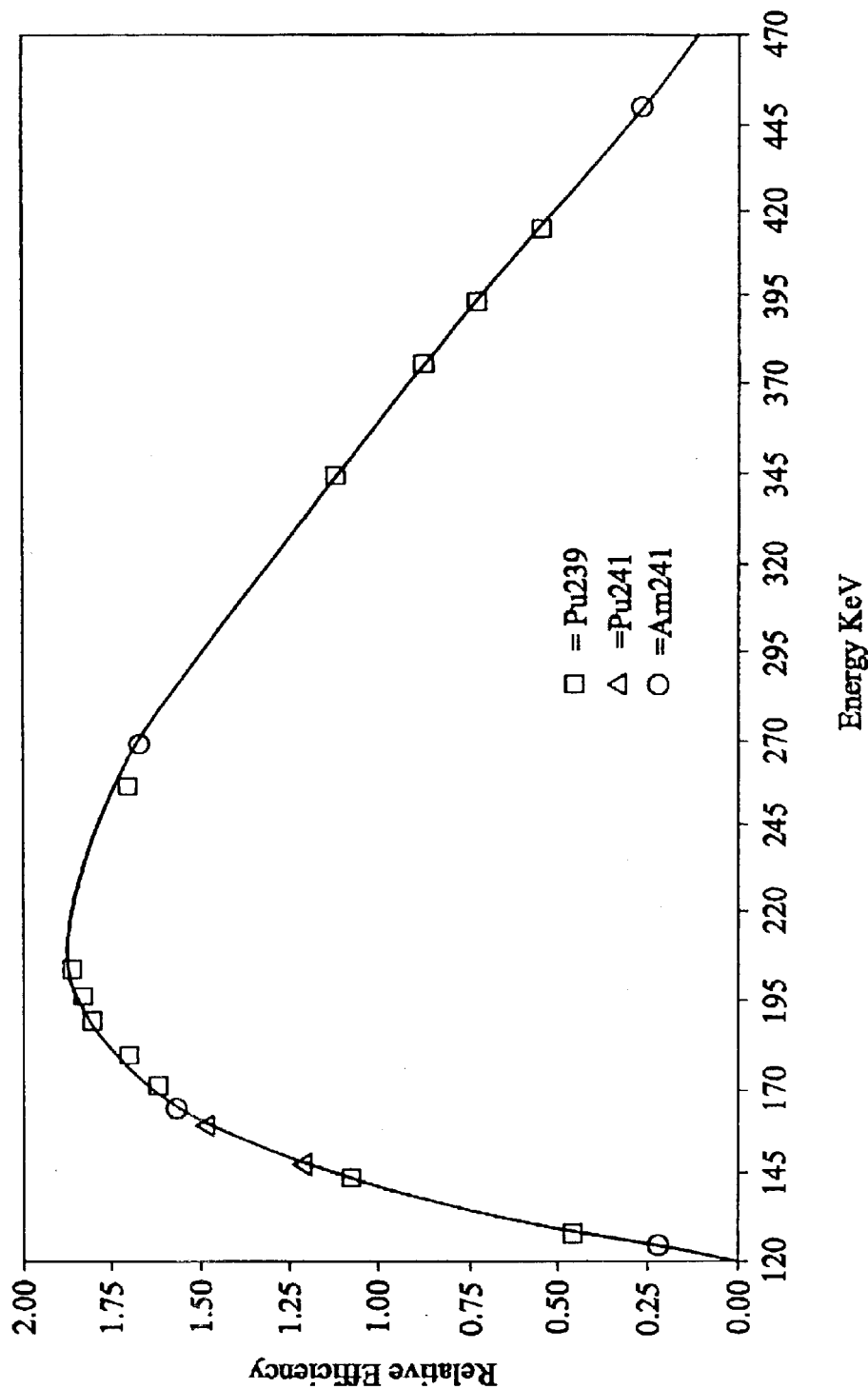
Figure 3:
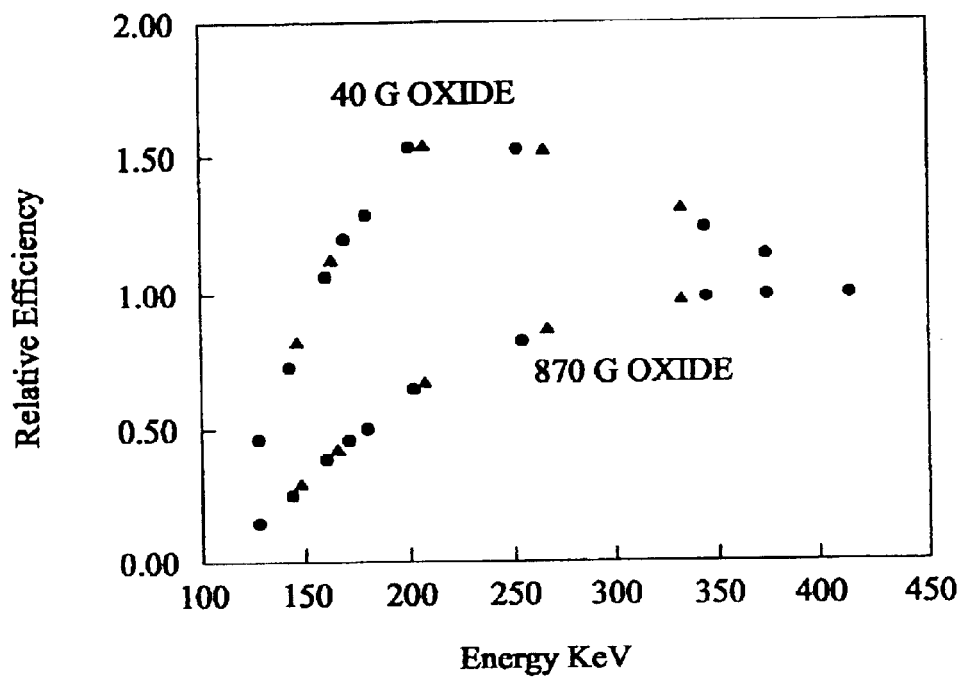
FIG. 3 illustrates relative detector efficiency against gamma ray energy for a 40 g oxide and 870 g oxide sample according to an alternative reference.

The potential variation in even simple samples analyzed under laboratory conditions is evident from FIGS. 2a, 2b and 3.

FIG. 2a illustrates the variation in the efficiency of detection against gamma ray energy for a 2 kg sample of plutonium oxide which has been aged. As can be seen the levels actually detected vary significantly across the energy spectrum.

The differences in this variation between situations is apparent from considering FIG. 2b against FIG. 2a. FIG. 2b illustrates the equivalent efficiency curve for a 5 g aliquot of the 2 kg sample considered in FIG. 2a. Differences at all energies are encountered, but there is a particularly prominent affect at energy levels above 250 KeV. These so-called "global efficiency curves" are taken from the ASTM "Standard test method for determination of plutonium isotopic composition by gamma-ray spectrometry" C 1030-89 reference.

FIG. 3 illustrates similar global efficiency curves for different samples in a different arrangement and referenced from Reilly et al., "Passive non-destructive assay of nuclear materials", US Regulatory Commission, March 1991, pp 221–271. Again, significant variation between samples is encountered.

This illustration of the variations in the detector intrinsic efficiency curve which occurs for varying levels of waste in varying materials is indicative of the problems to be encountered in practice. However, the situation is far worse in real life situations where far more complex variations in material, self-absorption by the sources and attenuation effects come into play compared with these laboratory produced, relatively simple samples.

It is possible to calculate the level of gamma emitting sources, based on a comparison of the interrelationship of detected intensities at gamma energies within the spectrum which are attributable to a specific isotope of the gamma emitter or emitters. From this overall level can be determined.

To counteract the problems in the detector intrinsic efficiency curve, detailed above, it is possible to use those isotopic gamma line ratios which are determined from intensities detected for pair of energies which are close to one another. The basic assumption in such cases is that the two energies considered are so close to one another that their detection efficiency should not be sufficiently different from one another to have a significant effect. This technique creates problems in real life situations as it limits the number of ratios which can be compared, and indeed in some cases reduces the number to a non-viable level. Obtaining the most accurate line ratios possible is key to obtaining the most accurate final isotope values.

To achieve this in the improved technique set out below, the gamma line intensities are precorrected before being used in the gamma line ratio based calculations discussed above. The pre-correction technique involves a number of stages which are applied to the raw intensities detected.

Firstly the emission intensities for a characteristic isotope of the principal emitter under consideration are corrected according to the gamma line emission rate associated with that energy. In plutonium containing waste considerations each $Pu^{239}$ intensity is corrected by dividing in this way. The emission rates (gammas per sec-g) are taken from data records. For instance the standard reference "Table of Radioactive Isotopes" by E. Browne and R. Firestone 1986 Ed3 can be used.

Correction in this way accounts for the inherent differences in the likelihood of emission at the respective energies.

The corrected intensities are then further corrected according to the intrinsic detector efficiency as it varies across the energy spectrum. Detectors inevitably do not detect emissions with the same efficiency across the full energy range. The data required is generally available from the detector manufacturer or can be determined by using known emission source intensities spread across the energy spectrum and measuring the detected levels.

Correction in this way accounts for the inherent differences in the likelihood of detection by the detector at the respective energies.

Finally the further corrected intensities are still further corrected to account for the attenuation occurring by the material. The correction factor used in the specific example of plutonium containing waste is a two parameter attenuation correction factor according to the equation:

$$G(E_{gam}) = e^{(-K1 \cdot f1)} * e^{(-K2 \cdot f2)}$$

where K1 and K2 are the two attenuation correction fit parameters and f1 and f2 are the "low Z" and "high Z" functions of gamma energy. The parameters f1 and K1 characterize the properties of the average attenuation caused by lighter elements (atomic weight=20 or less) in the waste material and likewise f2 and K2 characterize the average properties for the heavier elements (atomic weight greater than 51) in the matrix. The f1 and f2 are a function of atomic weight and energy and empirical relationships for both have been determined. The relationships are respectively:

$$f1 = 0.0783461 + 304.893 y^{-1.61715} \text{ and}$$

$$f2 = 0.07344265 + 339907 y^{-2.65611}$$

where y is the energy in keV and is constrained to the range (50<y<2700) keV.

The parameters K1 and K2 are associated with the attenuation model and in invariant with respect to the energy of the gamma photons.

The overall computation can be expressed as:

$$M_{yx@y} = \frac{R_{y@y}}{\varepsilon_{y@y} A_{yx@y} e^{-f1K1} e^{-f2K2}} g - x$$

to give the mass of isotope x in grams (g-x); where $R_{y@y}$ is the count rate of the gamma peak for isotope x at energy y; $\varepsilon_{y@y}$ is the efficiency of the detector system at energy y; $A_{y@y}$ is the specific activity of isotope x at energy y; and $e^{-f1K1} e^{-f2K2}$ is a two-material attenuation model.

Using the method detailed above the "apparent $Pu^{239}$ mass" can be calculated for the gamma line at each of the selected intensities, with those intensities corrected in this way. The "apparent $Pu^{239}$ mass" for each line is then statistically combined and analyzed, with a weighting according to its significance. The arising standard deviation for this set is then compared with the standard deviation arising from another set with differing K1 and K2 values. The process is repeated with differing K1 and K2 values, using a least squares approach, to determine the K1 and K2 values which give the best fit for the "apparent $Pu^{239}$ mass" and hence give the best set of corrected $Pu^{239}$ line intensities.

In the case of $Pu^{239}$ the gamma lines 98.4, 129, 203, 375 and 414 keV are generally used in the fitting procedure. Although other isotopes can be used, these generally lie within this spread, and due to the use of statistical error weighting (which makes the strong lines dominant in the analysis) they would make a lesser contribution in any event. The lines used are strong in intensity and are widely spread across the spectrum range of interest. This is beneficial in giving a broad range fit and in making the analysis robust.

Figure 4:
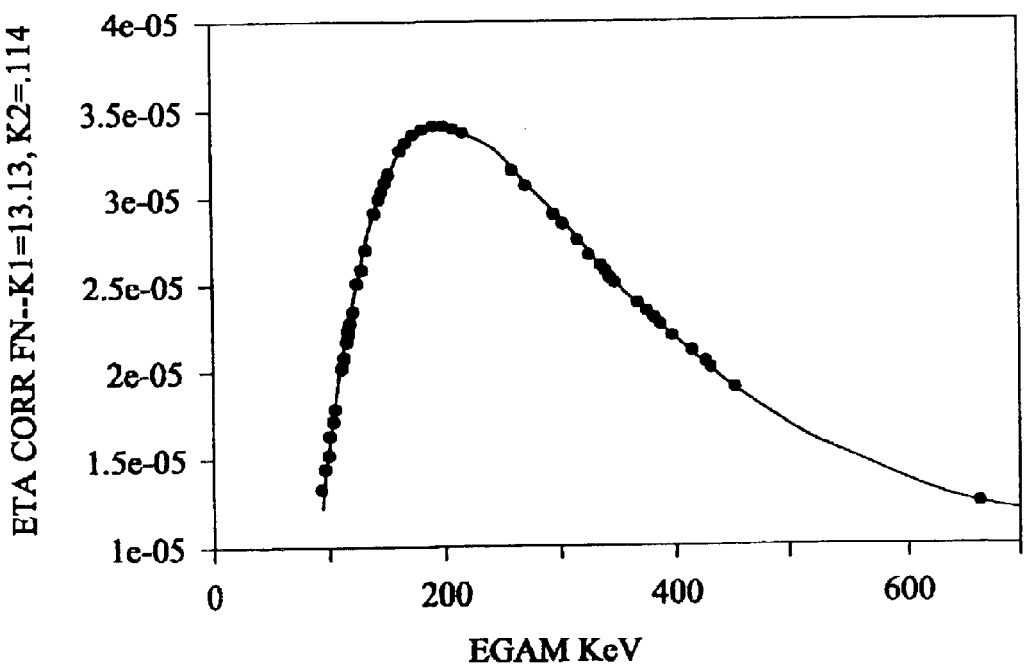
FIG. 4 illustrates an efficiency attenuation correction function for a typical LLNL waste drum.
Figure 5A:
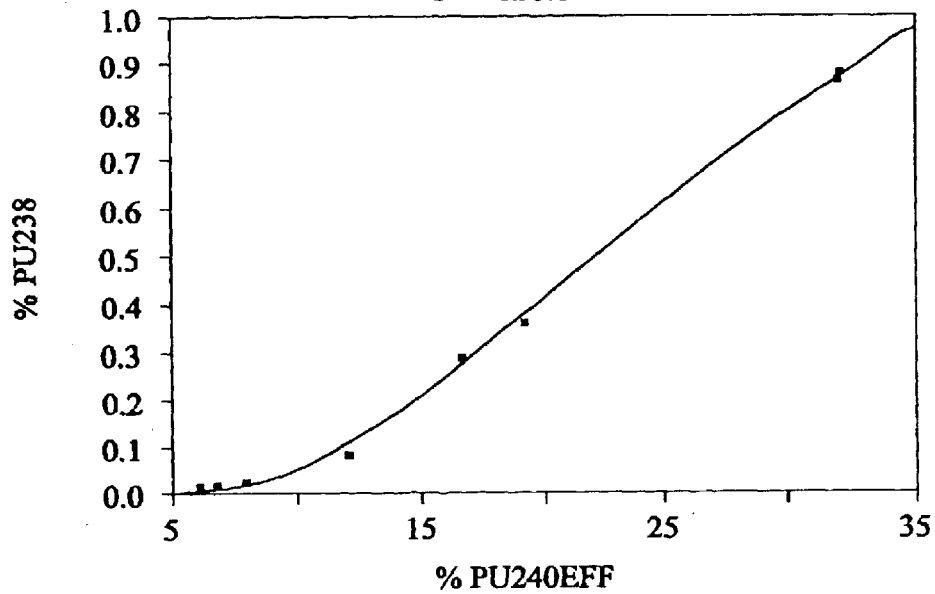
FIG. 5a illustrates the isotopic correlation for $PU^{238}$ as a function of $PU^{240}$ effective.
Figure 5B:
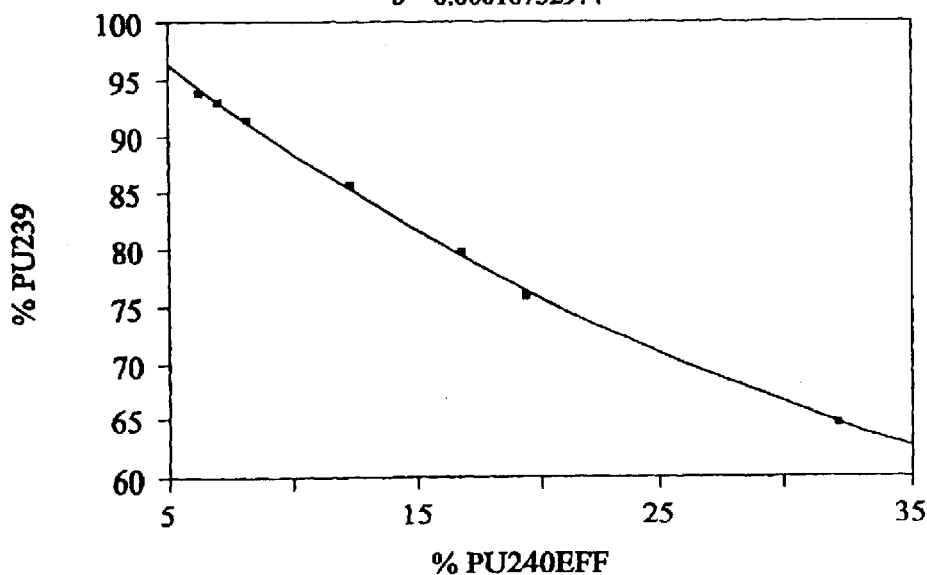
FIG. 5b illustrates the isotopic correlation for $PU^{239}$ as a function of $PU^{240}$ effective.
Figure 5C:
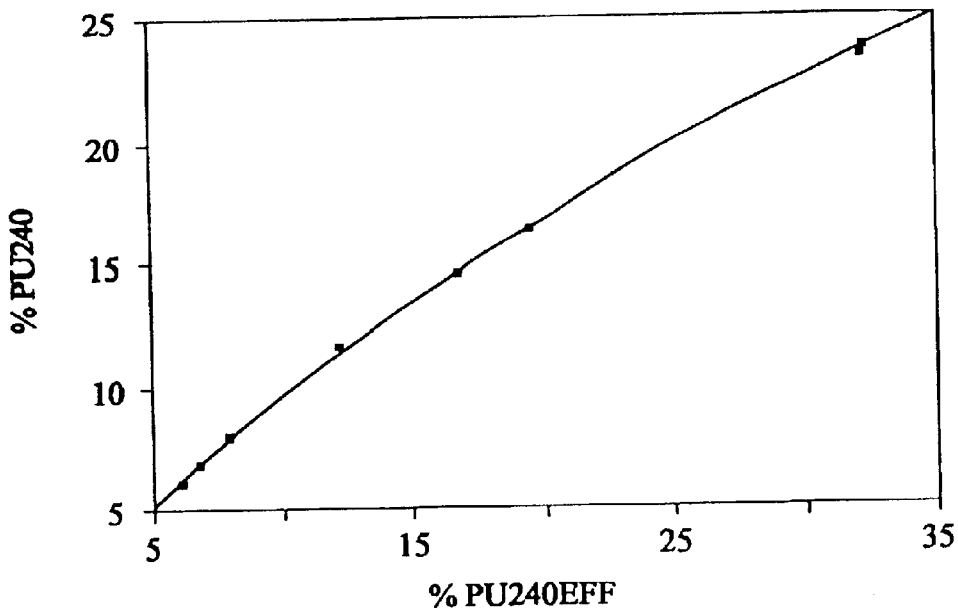
FIG. 5c illustrates the isotopic correlation for $PU^{240}$ as a function of $PU^{240}$ effective.
Figure 5D:
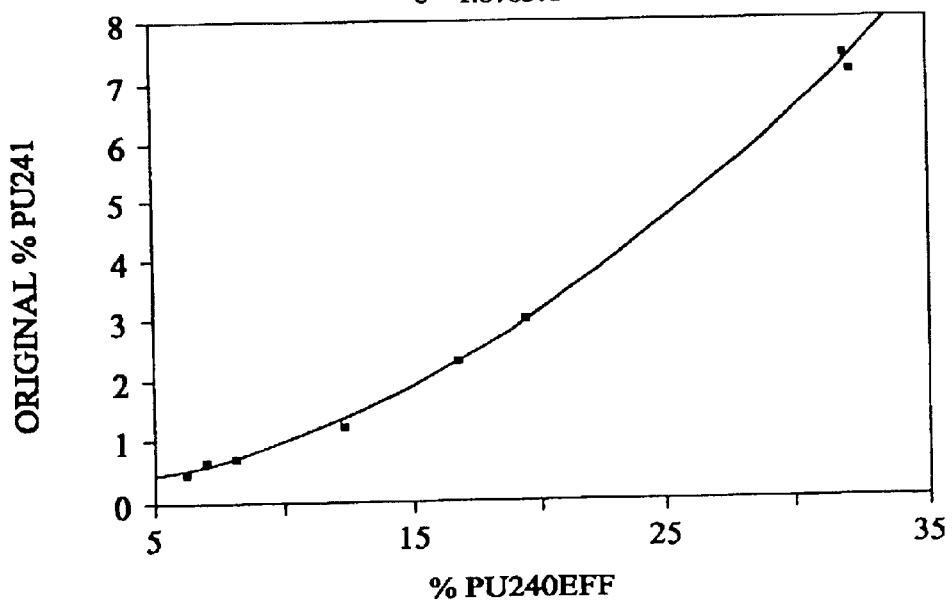
FIG. 5d illustrates the isotopic correlation for $PU^{241}$ as a function of $Pu^{240}$ effective.
Figure 5E:
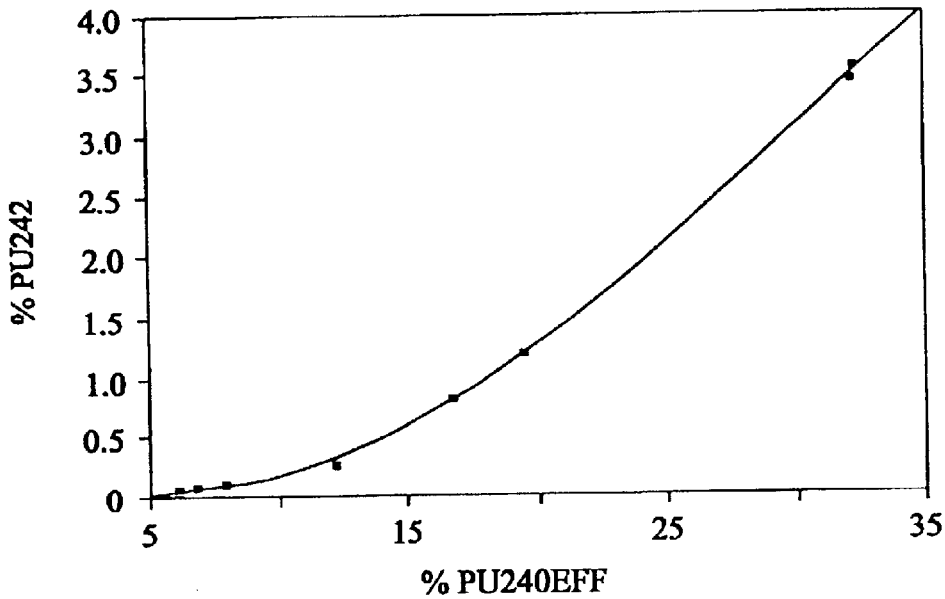
FIG. 5e illustrates the isotopic correlation for $Pu^{242}$ as a function of $Pu^{240}$ effective.

A typical profile for an efficiency/time/attenuation correction achieved according to this technique for a waste drum is presented in FIG. 4. The plot is for a few 10's of grams Pu, and gave rise to a K1 value of 13.13 and a K2 value of 114. As can be seen, the plot is generally parabolic in profile and features principal gamma lines throughout its spread. These are 98.4 and 129 in the lower energy part, where large scale attenuation is encountered, 375 and 414, in the higher energy part, where low detector efficiency occurs, and 203 in the mid-energy part As can be seen from the plot, the occurrence of the other gamma intensity points on the curve is in good agreement with the profile derived from the basic lines.

Similar application of the methodology to hundreds of real life waste drums, with Pu loadings from<0.1 g to 65 g, and to different isotopic compositions, such as a variety of Pu forms and grades, have produced similarly excellent results.

Once the container correction factor has been determined in this way it can be used to immediately correct all of the intensities at the other gamma lines from the same isotope as used in the determination and the intensities for of the gamma lines from the other isotopes. The isotope line ratio based calculations can then be performed and the masses associated with each of the isotopes can be determined.

The benefits of this technique are such that not only does it improve the accuracy with intensities near one another which are used as pairs, but it also facilitates the use of pairs made up of energies widely separated from one another in the spectrum. The resulting determination is more accurate and more robust, a particularly important consideration in relation to low gamma emitter concentration materials.

Further enhancements of the evaluation are possible. In practice a number of lines of different gamma emitters occur relatively close to one another, relative to the resolution of the gamma detector. In some cases the lines are so weak as not to require accounting for, but in some cases (for example Am241 at 125.3 keV and $Pu^{239}$ at 125.2 keV) correction is desirable. Correction is effected by taking into account the contribution of each interfering spectral line. The contribution of isotope z having an interfering line at energy y to isotope x is:

$$M_{yz@y} = \frac{\overline{M_{yz}} A_{yz@y}}{A_{yz@y}} g - x$$

to give the mass of isotope x in grams (g-x); where $\overline{M_{yz}}$ is the average mass of isotope z computer using its dominant lines. Note that these line masses are proportional to the actual isotopic masses. The proportionality constant does not vary with isotope.

The mass for a dominant line, with an interfering line, can then be computed by reducing the computed mass for that line by the correction given in the above mentioned equation.

For example, in systems with 23 dominant lines having interference, 23 non-linear equations comprising forms of the overall equation identified above, with interfering feedback from the interference correction equation identified above must be determined. The set of equations is converging and is solved by iteration for selected values of K1 and K2, the attenuation parameters.

The process is assisted in that the same isotopic mass generates each of its associated spectral lines. Therefore, attenuation parameters K1 and K2 must be selected such that the mass is reported by the solution of the line mass equations are equal for the same isotope. To do this the following statistics for each isotope x are evaluated and considered. These are the average mass of isotope x:

$$\overline{M_{yx}}$$

and the standard deviation of the mass of isotope x respectively for each of the dominant spectral lines of isotope x:

$$s\overline{M_{yx}}$$

As in the basic technique, the five dominant lines of $Pu^{239}$ are used to determine K1 and K2 by means of these statistics. Specifically, K1 and K2 are selected such that the term $$\frac{sM_{yPu}^{239}}{M_{yPu}^{239}}$$

is minimized. As before, due to uncertainties associated with the count rate for each gamma line, in computing this ratio, each count rate is inversely weighted by the uncertainty associated with its respective gamma line. Once again, once K1 and K2 have been determined by means of the $Pu^{239}$ line masses, those attenuation coefficients can be used to determine the remainder of the isotopic line masses and their average mass $\overline{M_{yx}}$.

These adjustments are once again preferred before the isotopic line ratio calculations are performed.

Gamma Emitters Isotopic Evaluation

Even though the gamma emission detection stage provides substantial information about isotopes present and their levels, a more detailed approach is useful to account for those isotopes which are not gamma emitters or which do not emit significantly to be readily detectable. This is particularly so for low activity containing materials. The technique applied to achieve this is based on isotopic correlation, particularly for plutonium.

Plutonium isotopes are generated in the nuclear reactor. The relative amounts of each isotope are related to the flux exposure time and other factors. The isotopic make up between batches varies smoothly. Additionally decay, and hence the age of the plutonium, is not a significant factor in the analysis as the half life of the isotopes under consideration is so long.

The preferred expression parameter for use in such correlation is $Pu^{240}$ effective ($Pu^{240}$eff), which is deemed to be the total spontaneous fission mass (relative to the total Pu mass)—expressed as $Pu^{240}$ equivalent. In reaching this equivalent, it should be noted that $Pu^{238}$ produces 2.63 times as many spontaneous fission neutrons as the same mass of $Pu^{240}$ and a mass unit of $Pu^{242}$ produces 1.72 times as many spontaneous fission neutrons as $Pu^{240}$. In the preferred determination, therefore:

$$Pu^{240}\text{eff}=1*Pu^{240}+2.63*Pu^{238}+1.72*Pu^{242}$$

In making the analysis, the technique makes use of a database containing characterization information for isotopic weight percentage and $Pu^{240}$eff for a variety of, and characteristic, samples. The samples have been analyzed over time from a variety of sources using mass spectrometer precision to determine the isotope interrelationship.

Figure 6A:
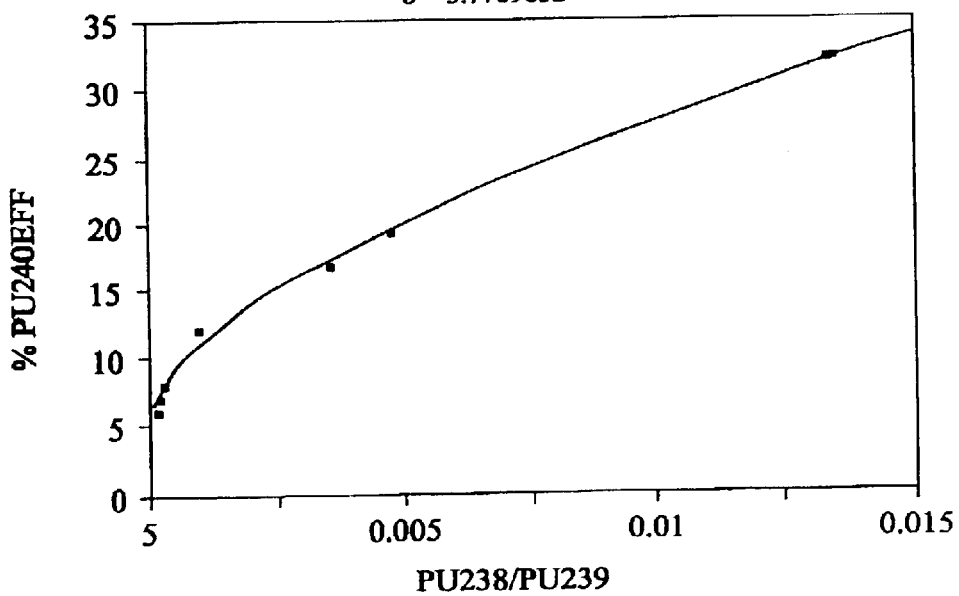
FIG. 6a illustrates the isotopic correlation of percentage $Pu^{240}$ effective as a function of the $PU^{238}$ to $PU^{239}$ ratio.
Figure 6B:
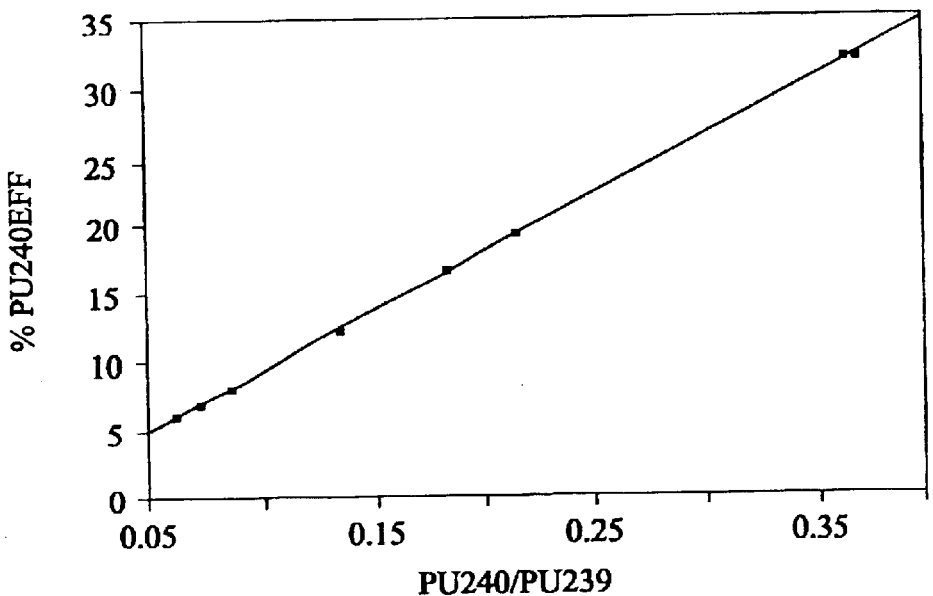
FIG. 6b illustrates the isotopic correlation of percentage $PU^{240}$ effective as a function of the $PU^{240}$ to $PU^{239}$ ratio.
Figure 6C:
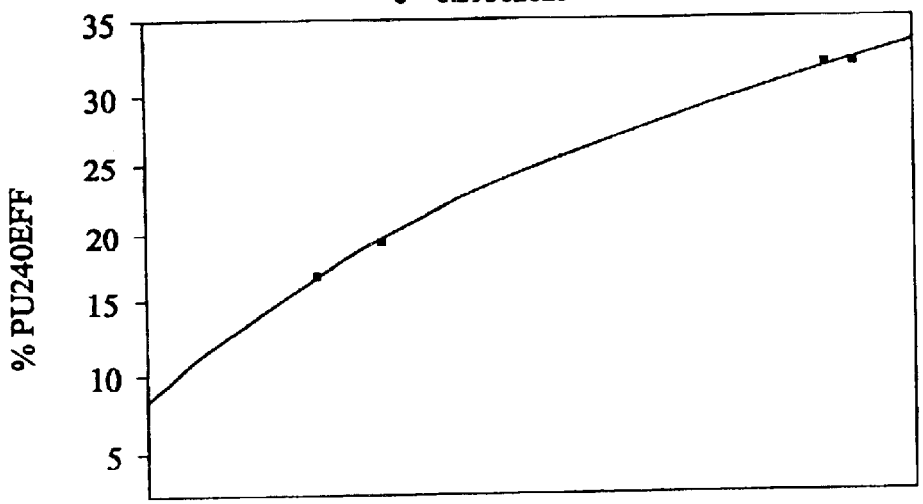
FIG. 6c illustrates the isotopic correlation of percentage $PU^{240}$ effective as a function of the $PU^{241}$ to $PU^{239}$ ratio.

This data is used to generate a series of functional fits between weight percent of the isotope and the $Pu^{240}$eff. These values are presented in FIGS. 5a, 5b, 5c, 5d and 5e. These plots in turn can be used to generate calibration plots for $Pu^{238}$ to $Pu^{239}$ ratio, $Pu^{240}$ to $Pu^{239}$ ratio and $Pu^{241}$ to $Pu^{239}$ ratio, set out in FIGS. 6a, 6b and 6c. By using the experimental values obtained from the measured gamma line ratios for each of these considerations a percentage $Pu^{240}$eff value can be obtained in each case and then be statistically analyzed to give the final determination. This provides a useful confirming technique and is particularly useful in sparse emission cases where determinations of the other plutonium isotopes are likely to be present may not be determinable from a direct gamma line ratio consideration. $Pu^{242}$ would be one such isotope.

Active Neutron Evaluation

This measurement is performed based on the differential die-away technique. The matrix is interrogated with neutrons of a wide energy spectrum ranging from 14 MeV to thermal energy levels with a view to measuring the fissile content of the material in the container and determining both the neutron absorbing properties and the neutron moderating properties of the material and the container.

Figure 7:
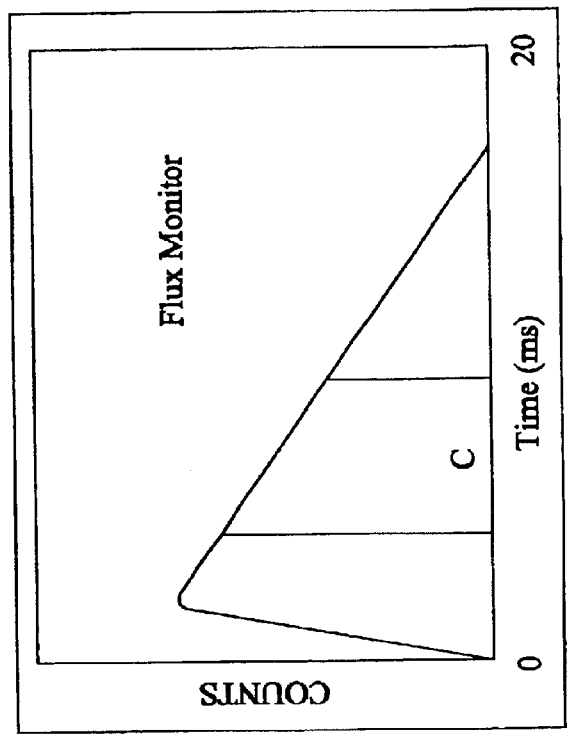
FIG. 7 illustrates a signal representative of active neutron counting with time.
Figure 7:
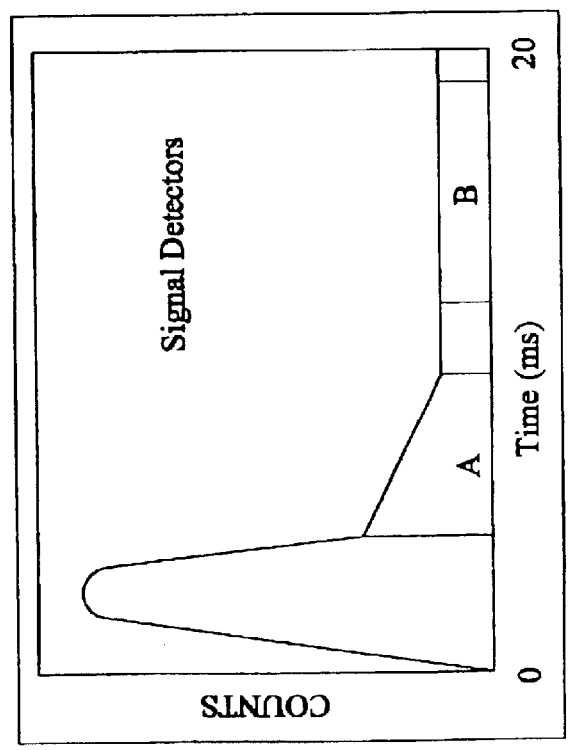

A typical neutron time history recording of the detectors is shown in FIG. 7. The initial large peak in the curve is due to the large pulse of neutrons from the neutron detector, as those neutrons become thermalised in the material, fissionable isotopes at present undergo an (NF reaction). These fission events produce the neutron counts shown in the time history in area A. Area A gets larger as the amount of fissile signal in the material increases. Area B is the constant background portion that is the result of cosmic rays (alpha, n) sources, and spontaneous fission neutron emitters within the material.

A small $He^3$ tube flux monitor, housed in close proximity to the neutron generator in the moderating assembly, measures the interrogating neutron flux. Area C represents the time average interrogating flux produced during the time when induced fissions are occurring. It has the same start and stop times as the signal detectors Area A.

The amount of fissile material on the waste drum is proportional to (A-B)/C.

This measurement is complicated, however, by the fact that neutron moderators and absorbers within the material produce affects requiring corrections. A flux monitor mounted close to the drum, can be used to determine the effective interrogative flux. As the amount of absorber in the drum increases the amount of flux measured by the flux monitor decreases. The ratio of the signal from the flux monitor to the internal flux monitor yields a measure of absorber effects. The moderator effects are determined with an epithermal neutron transmission technique. This involves measuring the epithermal neutrons exiting the waste drum on the side opposite the neutron generator. The epithermal count rate decreases rapidly as the amount of moderator in the waste drum increases.

The neutron absorber index and moderator index are obtained using a set of calibration matrix drums that span the anticipated moderator and absorber ranges. This matrix data can then be used with imaging algorithms to determine basic imaging matrix corrections for each drum. The imaging source data can then be analyzed with those correction factors to produce an accurate measurement of the fissile content of the material.

Passive Neutron Evaluation

The passive neutron measuring portion of the technique measures the neutron coincidence produced by spontaneous neutron emitters, such as $Pu^{240}$, $Pu^{238}$ and $Pu^{242}$. The neutron generator is turned off during this part of the measurement and the system acts as a neutron coincidence counter. The multiplicity data obtained is reduced to obtain a coincidence measurements that yields measure of the $Pu^{240}$ effective. The neutron moderator properties determined during the active part of the cycle and the passive imaging results are combined to apply the proper matrix corrections to yield an accurate measurement of the $Pu^{240}$ effective content of the material.

The knowledge of the plutonium isotopes necessary to convert the $Pu^{240}$ effective mass on the fissile mass to a total plutonium mass is obtained from the gamma energy analysis technique discussed above. As a result of the improvements in this technique, improvements in the results obtained from the neutron evaluation steps also occur.

Combined Use of Gamma Spectrum and Neutron Detection Data

The information obtained from the gamma detection, the information obtained from the passive neutron detection and the information obtained from the active neutron detection can be used together in a variety of ways. These co-uses, include verification of results and determinations of or corrections for other potential components of the material under consideration.

Both the gamma detection technique and neutron detection techniques generate a number of comparable raw data quantities. Thus, for instance, the ratio to $Pu^{239}$ gamma mass or the ratio to total Pu gamma mass, for the two can be compared to established whether the gamma detector determined values and neutron detector determined values are in general agreement. A significant discrepancy in the valuations can used to indicate a sample which requires more specific or detailed analysis to determine an accurate result.

Similarly, the gamma $Pu^{239}$ mass determined by the gamma detectors can be compared with the active mass determined from the neutron detectors to determine a general level of correspondence. For certain grades of Pu containing materials (which generally lack any fissile uranium isotopes), the $Pu^{239}$ is responsible for greater than 99.5% of the active neutron signal, and as a result, the active mass and gamma $Pu^{239}$ mass should be in close agreement.

These general measurements and comparisons can be extended to give a comparison for other isotopes for which the gamma measurements have been made by virtue of ratio to the $Pu^{239}$. In a more detailed consideration, materials containing fissile uranium isotopes can be accounted for.

Both $U^{233}$ and $U^{235}$ produce gamma emissions as well as active neutron signals. The gamma detectors will provide an indication as to whether $U^{233}$ and $U^{235}$ are present through the presence of absence of their characteristic emission lines from the gamma results. By virtue of the correction technique described above, accurate gamma masses for these uranium isotopes can be obtained and ratioed relative to the $Pu^{239}$ gamma mass. $U^{233}$ to $Pu^{239}$ and $U^{235}$ to $Pu^{239}$ mass ratios can be obtained as a result.

The active mass obtained through neutron based moments is expressible as:

measured active mass=1* $Pu^{239}$ mass+0.67*($U^{235}$ mass+$U^{233}$ mass)

when expressed in $Pu^{239}$ equivalent mass units. It is also possible to express the measured active mass as:

measured active mass=$Pu^{239}$ mass*(1+0.67*(mass $U^{239}$ +0.67*(mass $U^{233}$/mass $Pu^{239}$))

The $U^{233}/Pu^{239}$ and $U^{235}/Pu^{239}$ mass ratios determined from the gamma detectors can be utilized to correct the measured neutron detector based active mass for the $U^{235}$ and $U^{233}$ contributions as a result. The net active neutron $Pu^{239}$ mass established in this manner, by virtue of the U/Pu ratio, gives the corresponding $U^{235}$ and $U^{233}$ masses.

In another more detailed technique, the passive neutron part of the signal can also be used to determine Pu mass and the gamma detector data can also be used to determine percentage $Pu^{240}$eff, as discussed above. From the total Pu mass value for a container, the corresponding $Pu^{239}$ mass can be calculated using the corresponding percentage $PU^{239}$ value, see FIG. 5b. The other isotopic masses then followed by multiplication of the corresponding gamma line mass ratios with $Pu^{239}$.

In another technique the presence of other elements and their isotopes is accounted for. This technique offers the possibility for accounting for $Cm^{244}$ and $Cf^{252}$ material present in the waste. Both of these isotopes give passive neutron signals, but not gamma emissions. Attributing the gamma results to plutonium would give rise to a lower gamma mass value, due to the absence of any contribution from $Cf^{252}$ and $Cm^{244}$ to the gamma signal, than would be expected from the passive neutron signal, where these isotopes contribute to the signal. The result indicating a strong neutron coincidence mass from the passive neutron detector processing but without corresponding strong $Pu^{239}$ gamma mass, from the gamma detection results, would indicate spontaneous fission of $Cm^{244}$ or $Cf^{252}$, rather than Pu. In such cases, a smaller than expected Pu active neutron signal would arise too, as neither $Cm^{244}$ or $Cf^{252}$ contribute to the active neutron signal.

In a situation where $Cm^{244}$ and/or $Cf^{252}$ are determined as contributing, a more detailed analysis can then be carried out. The analysis takes into account the variation in detector efficiency with the amount of moderator present in the sample under evaluation, and also takes into account occurrences where the distribution of passive neutron source strength significantly depart from the average detector efficiency due to spatial distribution of the sources. Once an appropriate average detector efficiency has been established, the expected observed neutron multiplicity distribution for $Cm^{244}$ (average neutrons per spontaneous fission equals 2.8) and for $Cf^{252}$ (average neutrons per spontaneous fission equals 3.8) calculated using a simple algebraic sum over the expected binomial distribution that describes the number of singles, doubles, triples and quads expected per spontaneous fission for the two isotopes for the given average detector efficiency.

Observation of the net multiplicity count rates for the sample and comparison against the expected proportions for varying $Cm^{244}$ and $Cf^{252}$ ratios gives an indication as to the relative proportion of the two. The number of higher order multiplicity events increases dramatically as the level of $Cf^{252}$ increases within the ratio. The triples to doubles ratio for pure $Cm^{244}$ is 0.039 and for pure $Cf^{252}$ is 0.063. Similar analysis based on consideration of the different rates of doubles, triples and quadruples encountered in the neutron signal are possible for mixtures of $Cm^{244}$ with $Pu^{240}$ and a variety of other isotopes. A great deal of isotopic information can be derived in this way.

In addition to these affects and possibilities, the gamma detector signal also offers significant information where the material under evaluation contains emitters in chemical form with lighter elements. For instance, $PuF_4$ is a strong alpha, neutron source, but also gives rise to specific reaction gamma rays associated with the fluorine element. F(alpha, n) are strong lines 197, 583 and 2275 Kev, and the presence of these gamma energy signals in the results is an additional diagnostic feature. The combination of gamma detector information with the active neutron information enables the quantification of the $Pu^{239}$ level. This would not be possible with passive neutron detection alone, in combination with the gamma detection, as the strong alpha, neutron source would mask the spontaneous fission neutrons from the plutonium.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for investigating the level of one or more gamma emitting materials in a sample, the method comprising:

obtaining an intensity signal at a plurality of gamma ray energies, the plurality of energies including a plurality of energies characteristic of an isotope;

calculating a first mass level of the isotope based on an intensity of a first energy, the first mass level being corrected for attenuation at the first energy;

calculating a second mass level of the isotope based on an intensity of a second energy, the second mass level being corrected for attenuation at the second energy, and combining the first mass level and the second mass level in a weighted manner to give a first combined mass level.

2. A method according to claim 1 in which the first mass level is corrected for attenuation according to a first correction factor, the first correction factor being a function of the first energy and the second mass level is corrected for attenuation according to the first correction factor, the first correction factor being a function of the second energy.

3. A method according to claim 2 in which the first combined mass level obtained using the first correction factor is compared against a second combined mass level obtained by using a second correction factor, the second correction factor being varied from the first correction factor.

4. A method according to claim 3 in which the standard deviation of the first combined level is compared against the standard deviation of the second combined level, the comparison being repeated with still further combined mass levels corrected using still further correction factor values in order to determine a final correction factor, the final correction factor being adjusted to minimize the difference between standard deviations of the combined mass levels.

5. A method according to claim 2 in which the first correction factor includes two or more variable components, one component in the first correction factor relating to the attenuation effect of lower atomic mass elements, those less than 30, and another component relating to the attenuation effect of high atomic mass components, those greater than 30, in the sample.

6. A method according to claim 2 in which the first correction factor is defined by:

$$G(E_{gam}) = e^{(-K1 \cdot f1)} * e^{(-K2 \cdot f2)}$$

where K1 and K2 are attenuation correction fit parameters and f1 and f2 are the "lowZ" and "high Z" functions of gamma energy.

7. A method according to claim 1 in which the attenuation correction is provided together with detector efficiency correction and together with gamma line emission rate correction.

8. A method according to claim 2 in which the first mass level and second mass level are calculated according to the equation:

$$M_{yx@y} = \frac{R_{y@y}}{\varepsilon_{y@y} A_{yx@y} e^{-f1K1} e^{-f2K2}} g - x$$

to give the mass of isotope x in grams; where $R_{y@y}$ is the count rate of the gamma peak for isotope x at energy y; $\varepsilon_{y@y}$ is the efficiency of the detector system at energy y; $A_{yx@y}$ is the specific activity of isotope x at energy y; and $e^{-f1K1} e^{-f2K2}$ is the first correction factor.

9. A method according to claim 4 in which the final correction factor for the desired energy spectrum is used to correct all the gamma intensity values used in the subsequent calculations.

10. A method according to claim 9 in which the subsequent calculations calculate the isotopic masses for the materials present in the sample.

11. A method according to claim 1 in which combining the first mass level and the second mass level in a weighted manner gives higher weighting to the one of the first mass level and the second mass level which has the higher intensity energy and a lower weighting to the one of the first mass level and the second mass level which has the lower intensity energy.

12. A method according to claim 6 in which the values of K1 and/or the values of K2 are varied to vary the correction factor.

13. A method for investigating the level of one or more gamma emitting materials in a sample, the method comprising:

obtaining an intensity signal at a first gamma ray energy, the intensity at the first energy being corrected for variation in attenuation at that energy;

obtaining an intensity signal at a second gamma ray energy, the intensity at the second energy being corrected for variation in attenuation at that second energy;

the first and second energies being energies characteristic of a first isotope;

calculating a first mass level for the first isotope from the corrected intensity for the first energy;

calculating a second mass level for the first isotope from the corrected intensity for the second energy; and combining the first mass level and the second mass level in a weighted manner to give a combined mass level.

14. A method according to claim 13 in which the intensity at the first energy and the intensity at the second energy are corrected for attenuation according to a first correction factor.

15. A method according to claim 14 in which the combined mass level obtained using the first correction factor for a first set of energies, the first set of energies including at least the first energy and the second energy, is compared against a further combined mass level obtained using a second correction factor for a second set of energies, the second correction factor being varied from the first correction factor.

16. A method according to claim 15, wherein both of the first set of energies and the second set of energies includes at least the first energy and the second energy, wherein the first energy and the second energy are corrected for attenuation according to a first correction factor for the first set of energies and according to a second correction factor for the second set of energies.

17. A method according to claim 15 in which the standard deviation of the combined mass level for the first set is compared against the standard deviation of the combined mass level for the second set, the comparison being repeated with still further combined mass levels from still further sets corrected using different still further correction factors, the values for the still further correction factors being varied to minimize the difference in standard deviations of the combined mass levels.

18. A method according to claim 17 in which the first correction factor includes two or more variable components, one component in the first correction factor relating to the attenuation effect of lower atomic mass elements, those less than 30, and another component relating to the attenuation effect of high atomic mass components, those greater than 30, in the sample.

19. A method according to claim 14 in which the first correction factor is defined by:

$$G(E_{gam}) = e^{(-K1 \cdot f1)} * e^{(-K2 \cdot f1)}$$

where K1 and K2 are attenuation correction fit parameters and f1 and f2 are the "low Z" and "high Z" functions of gamma energy.

20. A method according to claim 13, further comprising calculating a detector efficiency correction and calculating a gamma line emission rate correction.

21. A method according to claim 14 in which the attenuation correction is included in the calculation for the first mass level and the second mass level according to the equation:

$$M_{yx@y} = \frac{R_{y@y}}{\varepsilon_{y@y} A_{yx@y} e^{-f1K1} e^{-f2K2}} g - x$$

to give the mass of isotope x in grams; where $R_{y@y}$ is the count rate of the gamma peak for isotope x at energy y; $\varepsilon_{y@y}$ is the efficiency of the detector system at energy y; $A_{y@y}$ is the specific activity of isotope x at energy y; and $e^{-f1K1} e^{-f2K2}$ is the first correction factor.

22. A method according to claim 19 in which a final attenuation correction fit parameter for the desired energy spectrum is determined from the attenuation correction and the final attenuation correction fit parameter is used to correct all the gamma intensities used in the subsequent calculations.

23. A method according to claim 22 in which the final attenuation correction fit parameter is used to correct the gamma intensities of one or more other isotopes.

24. A method according to claim 20 in which the subsequent calculations calculate the isotopic masses for one or more of the materials present in the sample.

25. A method according to claim 24 in which the calculations of isotopic masses include a calculation of gamma emitting and/or non-gamma emitting isotopes.

26. A method according to claim 25 in which the level of non-gamma emitting isotopes is determined through isotopic correlation and/or is derived from a ratio relative to determine levels for one or more gamma emitters.

27. A method for investigating the level of one or more gamma emitting materials in a sample, the method comprising:

obtaining an intensity signal at a first gamma ray energy, the intensity of the first energy being corrected for variation in attenuation with energy, calculating an apparent isotope mass for the first energy;

obtaining an intensity signal at a second gamma ray energy, the intensity of the second energy being corrected for variation in attenuation with energy, calculating an apparent isotope mass for the second energy;

combining the first energy apparent isotopic mass and second energy apparent isotopic mass in a weighted manner to give a first and second energy apparent isotopic mass combination;

obtaining an intensity signal at a further gamma ray energy, the intensity at the further energy being corrected for variation in attenuation with energy, calculating an apparent isotope mass for the further energy;

obtaining an intensity signal at a still further gamma ray energy, the intensity at the still further energy being corrected for variation in attenuation with energy, calculating an apparent isotopic mass for the still further energy;

combining the further energy apparent isotopic mass and still further energy apparent isotopic mass in a weighted manner to give a further and still further energy apparent isotopic mass combination;

the correction for variation in attenuation with energy involving a factor, the factor having a different value for the first and second energies to the value used for the further and still further energies; and comparing the standard deviation for the first and second energy apparent isotopic mass combination with the standard deviation of the further and still further energy apparent isotopic mass combination; the combination giving the lowest standard deviation giving the values for the factor used to correct for variation in attenuation with energy to be used in correcting intensities at other gamma ray energies;

the ratio between pairs of corrected energies of an isotope being used to calculate the level of that isotope in the sample.

* * * * *